Patented Dec. 6, 1932

1,890,040

UNITED STATES PATENT OFFICE

ARTHUR LÜTTRINGHAUS, OF MANNHEIM, HEINRICH NERESHEIMER, OF LUDWIGS-HAFEN-ON-THE-RHINE, WILLY EICHHOLZ, OF MANNHEIM, GEORG BOEHNER, OF EDINGEN-ON-THE-NECKAR, AND WILHELM SCHNEIDER, OF LUDWIGSHAFEN-ON-THE-RHINE, GERMANY, ASSIGNORS TO GENERAL ANILINE WORKS INC., OF NEW YORK, N. Y., A CORPORATION OF DELAWARE

PRODUCTION OF ANTHRAQUINONE AND DERIVATIVES THEREOF

No Drawing. Application filed May 3, 1929, Serial No. 360,324, and in Germany May 7, 1928.

The present invention relates to the production of anthraquinone and derivatives thereof and intermediate products from such condensation products of a quinone corresponding to the formula:

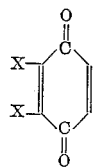

(in which the two X positions may be part of an attached benzene nucleus which may be substituted) with a 1.3-butadiene hydrocarbon, as contain the carbon skeleton of anthracene.

We have found that the compounds which can be obtained by condensing a quinone corresponding to the formula:

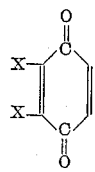

(in which the two X positions may be part of an attached benzene nucleus which may be substituted) with from 1 to 2 molecular proportions of a 1.3-butadiene hydrocarbon, can be converted into anthraquinone, or its derivatives by treating the said condensation products under non-acid conditions with an agent capable of splitting off hydrogen by oxidation. The term "non-acid conditions" is meant to include treating the condensation products in a molten state or in neutral or alkaline diluting or suspending media, such for example as water, alcohols, hydrocarbons, heterocyclic compounds and substitution products thereof of neutral or alkaline reaction, for instance nitrobenzene, trichlorobenzene, naphthalene and substitution products thereof, pyridine and the like. Diluting or suspending media particularly suitable for the purpose of the invention are aqueous solutions of caustic alkalies. By the employment of catalysts transferring oxygen, such as, for example, compounds of copper, cobalt, nickel, iron and the like, for instance their oxides, vanadates, chromates and the like, the process can be often accelerated. Agents splitting off hydrogen by oxidation comprise, for example, air, oxygen, hydrogen peroxide, potassium permanganate, perborates and the like. Since the said condensation products when treated in indifferent solvents with ozone, form ozonides which split up under destruction of the anthracene ring system, ozone does not fall under the term "agents splitting off hydrogen by oxidation".

In the aforesaid manner, for example, a mixture of 2.6- and 2.7-dimethylanthraquinone is obtained by boiling the condensation product of 1 molecular proportion of benzoquinone with 2 molecular proportions of isoprene with an alcoholic or aqueous solution of caustic alkali, while introducing oxygen or air. Condensation products from 1 molecular proportion of benzoquinone and one molecular proportion each of two different 1.3-butadienes can also be employed as the starting materials. In the same manner anthraquinone or a derivative thereof is obtained from a condensation product from 1 molecular proportion of an alpha-naphthoquinone and 1 molecular proportion of a 1.3-butadiene. Thus, for example, the condensation product from alpha-naphthoquinone and 1.3-butadiene, when heated with dilute caustic soda solution in a current of air or oxygen furnishes anthraquinone.

In the aforesaid reactions new valuable intermediate products can be obtained if the treatment is carried out under milder conditions than those leading to the formation of anthraquinone, preferably in the absence of agents splitting off hydrogen by oxidation, for instance by heating the condensation products above their melting point, or in an indifferent medium of a high boiling point, such for example as napthalene and the like, or if the said condensation products are treated with acid media, such for example as aqueous or alcoholic hydrochloric acid or hydrobromic acid, moderately diluted sulphuric acid and the like. Exact intimations about the conditions under which the said intermediate products are obtained cannot be given as they mutually depend on each other, for instance on the special condensation product employed, the temperature, concentration and duration of the treatment and so on. It can only be said that the stronger the conditions, the more any agent capable of splitting off hydrogen by oxidation should be excluded. The reactions taking place will first hereinafter be described with respect to the condensation products obtainable from an alphanaphthoquinone and a 1.3-butadiene, the corresponding reactions with the condensation products of p-benzoquinone and 1.3-butadienes proceeding in an analogous manner with some slight differences which will then be set forth.

In the aforesaid manner from condensation product of an alpha-naphthoquinone and a 1.3-butadiene compounds are obtained which have a phenolic character and which may be regarded as 1.4-dihydro-9.10-dihydroxyanthracenes. The simplest representative of said initial products has the formula given below, and the reaction is probably a displacement of hydrogen, and may be represented by the following formulæ:

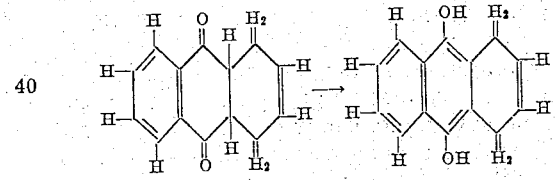

If for example the aforementioned condensation product is heated in an aqueous solution of an alkali metal carbonate in the presence of air, even in a strong stream of air, considerable amounts of 1.4-dihydro-9.10-dihydroxyanthracene are still obtained, if the reaction is interrupted after the displacement has taken place. It is only when introducing air for a longer time that 1.4-dihydro-9.10-dihydroxyanthracene is slowly converted into dihydroanthraquinone, and finally anthraquinone is formed. If however, under the same conditions of working an aqueous solution of caustic alkali is employed, as described in Example 6 hereinafter given, the total amount of the condensation product is converted into anthraquinone in a short time.

When effecting the said displacement by treatment with acid media or by heating the initial material above its melting point and if the products of displacement are to be isolated as such, it is also advantageous to exclude agents capable of splitting off hydrogen by oxidation as far as possible. Otherwise according to the conditions of the reaction more or less dehydrogenated products are obtained.

The 1.4-dihydro-9.10-dihydroxyanthracenes which have not yet been described in literature, generally are well crystallizing compounds, the simplest representatives of which are colorless and can be melted or sublimed in vacuo without undergoing decomposition. They dissolve in hot water with difficulty, but more easily in low boiling, and readily in high boiling organic liquids. Being derivatives of 1.4-dihydroxynaphthalene they are sensitive to air, though less than the corresponding 9.10-dihydroxyanthracenes not hydrogenated at the carbon atoms in the 1.4-positions. When exposed to the air, especially in a moist state, they often slowly assume from blue to violet colors, probably owing to the formation of products of a quinhydronic nature. These substances of quinhydronic nature form intermediate products in the dehydrogenation of the 1.4-dihydro-9.10-dihydroxyanthracenes into the 1.4-dihydroanthraquinones, which generally speaking can be obtained, if the reaction is conducted in such a manner, that further dehydrogenation to the corresponding dihydroanthraquinones does not take place, or takes place more slowly than the formation of the dihydroanthraquinones. Suitable agents for such dehydrogenation are, for example, aqueous or alcoholic solutions of ferric chloride, at ordinary or slightly elevated temperatures, or air applied in an alkali metal carbonate solution or the like.

The 1.4-dihydroanthraquinones are practically insoluble in water, but are generally more easily soluble in organic solvents than are the corresponding dihydro-9.10-dihydroxyanthracenes. When heated to or above their melting point they often undergo a rearrangement, probably with an intermediate displacement into 9.10-dihydroxyanthracenes, since, for example, the resulting products from 1.4-dihydroanthraquinone are the same as those obtained while heating the 9.10-dihydroxyanthracene, namely, anthraquinone, anthrone and water (Meyer, Annalen der Chemie, Vol. 379, page 61).

Also with the aid of alkaline media, such as alkali metal hydroxides or carbonates, the 1.4-dihydroanthraquinones are converted in most cases at elevated temperature, apparently at first into 9.10-dihydroxyanthracenes, which then are dehydrogenated by unchanged dihydroanthraquinone to form the corresponding anthraquinones. In fact it is possible to quantitatively dehydrogenate 9.10-dihydroxyanthracene in an aqueous alkaline solution by the equimolecular amount of 1.4-dihydroanthraquinone to anthraquinone with the formation of the corresponding amount of 1.4-dihydro-9.10-dihydroxyanthracene. This reaction therefore proceeds according to the following equations, as regards the simplest representative of the class, the 1.4-dihydroanthraquinone:

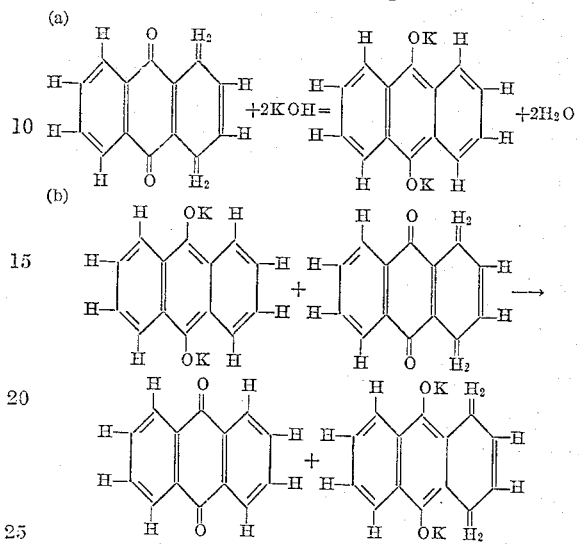

The velocity of the reaction (b) must be at least as great as the velocity of (a), as otherwise the final product would contain besides anthraquinone and 1.4-dihydro-9.10-dihydroxyanthracene also 9.10-dihydroxyanthracene.

The rearrangement of the dihydroanthraquinones into 9.10-dihydroxyanthracenes also explains very simply the easy formation of anthraquinone and its derivatives from the condensation products of 1.4-naphthoquinones with 1.3-butadienes by alkaline agents in the presence of media capable of taking up hydrogen.

The aforedescribed 1.4-dihydroanthraquinones and anthraquinones are also obtained by intramolecular splitting out hydrogen halides from the condensation products obtained from 1.3-butadiene and alpha-naphthoquinones which are substituted in the 2-position or in the 2- and 3-positions by halogen. Thus 1.4-dihydroanthraquinone or anthraquinone is obtained according to the following equations:—

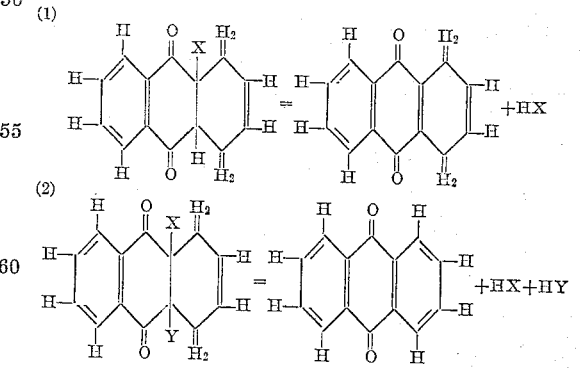

in which X and Y are halogen.

The said intramolecular splitting out may be carried out by a great variety of methods, for example by heating the said condensation products either alone or in the presence of diluents, by the action of acids, bases or suitable salts and the like. By employing appropriate working conditions, for example by working at higher temperatures or in a suitable diluent such as alcohol, the preparation of the initial material and the said intramolecular splitting out may be carried out in one operation.

The reaction according to Equations 1 and 2 may also proceed in a slightly different manner, which depends on whether substances which supply hydrogen or whether substances which take up hydrogen are present in the preparation of the said reaction products. Thus, when 2-chlor-1.4-naphthoquinone is heated with 2.3-dimethyl-1.3-butadiene in alcohol, the formation of 2.3-dimethyl-1.4-dihydroanthraquinone in a manner analogous to Equation 1 should be expected. As a matter of fact, however, the formation thereof may not take place, but under certain conditions, for example at 100° to 105° C. 2.3-dimethylanthraquinone is obtained. This may be explained by the assumption that the dimethyldihydroanthraquinone probably first formed is dehydrogenated by the chlornaphthoquinone which has not yet been converted. On the other hand, when working in the presence of agents which supply hydrogen, such as sodium hydrosulphite, the hydroquinones corresponding to those quinones the formation of which is to be expected according to Equations 1 and 2, are obtained, for examples as shown in the following Equation 3:—

(3)
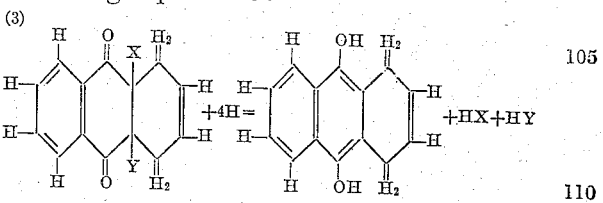

Intermediate products which are similar to those obtained from the condensation products of an alpha-naphthoquinone and a 1.3-butadiene are obtained when treating the condensation products obtained from 1 molecular proportion of p-benzoquinone and 2 molecular proportions of the same or different 1.3-butadienes in the manner described with respect to the condensation products of alpha-naphthoquinone and 1.3-butadienes probably in the way shown by the following formulæ:—

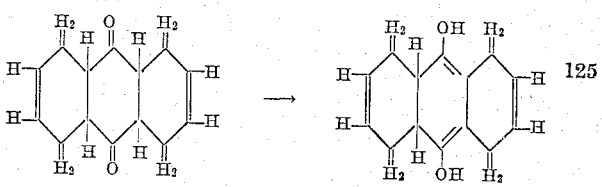

The above constitution of the reaction products is sustained by their isomerism to the starting material, but as distinct from the above described 1.4-dihydro-9.10-dihyproxyanthracenes these products have no phenolic character. They differ from the initial materials by generally possessing such higher melting points and showing different solubilities.

The last mentioned products can be transformed into compounds of phenolic character, by dehydrogenation under mild conditions. The reaction probably proceeds according to the following formulæ:—

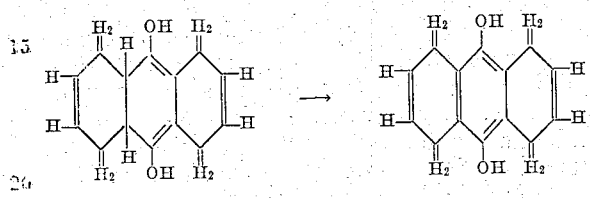

The products obtained are therefore regarded as 1.4.5.8-tetrahydro-9.10-dihydroxyanthracenes which in the following description therefore will be specified by this name. Instead of starting from the said rearranged products, the condensation products from 1 molecular proportion of p-benzoquinone and 2 molecular proportions of 1.3-butadienes, generally speaking can be employed directly, in most cases the aforesaid displacement of the hydrogen atoms taking place during the dehydrogenation process simultaneously.

The formation of the phenols can be effected for example by dehydrogenating media of an acid reaction, for instance by an amount of ferric chloride necessary for removing two hydrogen atoms in alcoholic or aqueous solution, but the dehydrogenation may also be carried out in the presence of alkaline agents while using limited amounts of media taking up hydrogen, such as oxygen, potassium, ferricyanide, aromatic nitrocompounds and the like.

The 1.4.5.8-tetrahydro-9.10-dihydroxyanthracenes which have not yet been described, generally speaking, are colorless, well crystallizing compounds, the simplest representatives of which melt without decomposition. They are soluble with difficulty in hot water, to some extent in low boiling, but readily in high boiling organic liquids. As derivatives of dihydroxybenzene they give in solutions of caustic alkalies nearly colorless solutions. They are sensitive to air, though in a much less degree than the corresponding 9.10-dihydroxyanthracenes which are not hydrogenated in the 1.4.5.8-positions. They darken slowly on exposure to the air, especially when in a moist state, probably under formation of products of a quinhydronic character. On further dehydrogenation, which may be carried out, if desired, in one operation simultaneously with their production, they next form 1.4.5.8-tetrahydroanthraquinones.

The 1.4.5.8-tetrahydroanthraquinones are yellow compounds practically insoluble in water, yet generally speaking well crystallizing from organic solvents. Like other anthraquinones hydrogenated in the alphapositions (compare Schroeter, Berichte, Vol. 57, page 2012; Skita, Berichte, Vol. 58, page 2695) they easily are converted into the isomeric hydroquinones. Thus, for example, by boiling 1.4.5.8-tetrahydroanthraquinones with acetic anhydride, the diacetate of 1.4-dihydro-9.10-dihydroxyanthracene is obtained, according to the following formulæ:

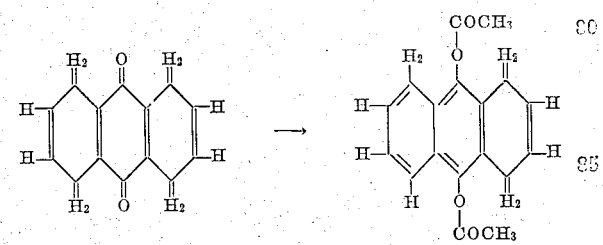

The 1.4-dihydro-9.10-dihydroxyanthracene themselves, are readily transformed as described above, by dehydrogenation into anthraquinones. The 1.4.5.8-tetrahydro-9.10-dihydroxyanthracenes and the 1.4.5.8-tetrahydroanthraquinones therefore may be regarded as intermediate products in the aforedescribed production of anthraquinones and may, if desired, be worked up to anthraquinones.

Compounds having a phenolic character can also be obtained by treating the condensation products of 1 molecular proportion of p-benzoquinone with 2 molecular proportions of 1.3-butadienes or the beforementioned compounds of the general formula

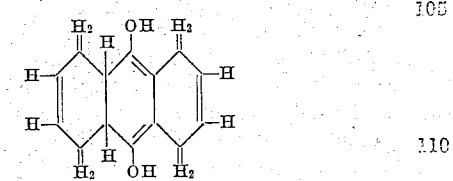

with alcoholates or mixtures containing the same in the absence of agents which are capable of taking up hydrogen. By their behaviour and by analysis these new products must be considered to be hexahydro-9.10-dihydroxyanthracenes corresponding to the formula:

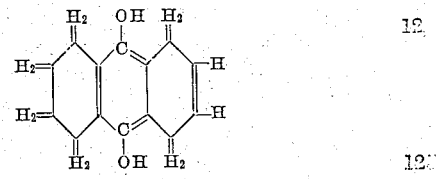

and they are readily converted into the corresponding hexahydroanthraquinones by dehydrogenation.

The products obtainable according to the present invention can be employed for the production of coloring matters and pharmaceutical products.

The following examples will further illustrate how the said invention may be carried out in practice, but the invention is not limited thereto.

*Example 1*

3 parts of the condensation product from 1 molecular proportion of benzoquinone and 2 molecular proportions of isoprene (obtainable according to the Berichte der Deutschen Chemischen Gesellschaft, 53, 822) are heated to boiling with 250 parts of a 5 per cent aqueous solution of caustic potash while introducing air until a sample of the product can be completely vatted to a red vat. The reaction product, which consists of a mixture of 2.6- and 2.7-dimethylanthraquinone, is filtered by suction, and extracted with methyl alcohol, in which the 2.7-dimethylanthraquinone is readily soluble. The residue may be purified, for example by crystallization from chlorbenzene and consists of 2.6-dimethylanthraquinone. Pure 2.7-dimethylanthraquinone is obtained by treating its solution in methyl alcohol with water, and recrystallizing the deposited product from ethyl alcohol.

Sodium m-nitrobenzene sulphonate may be added to the reaction mixture as an agent capable of splitting off hydrogen by oxidation instead of passing air through the mixture.

*Example 2*

The condensation product from 1 molecular proportion of benzoquinone and 2 molecular proportions of isoprene (obtainable according to the Berichte der Deutschen Chemischen Gesellschaft, 53, page 822) is separated into two isomeric substances by fractional crystallization from organic solvents of low boiling point, for example ether and benzene. 3 parts of the substance more difficultly soluble in ether are heated to boiling with 250 parts of a 5 per cent aqueous solution of caustic potash while introducing air until a sample of the product can be completely converted into a red vat. The reaction product is practically pure 2.6-dimethylanthraquinone.

Other substances taking up hydrogen, such as for example potassium ferricyanide or the sodium salt of m-nitrobenzene sulphonic acid, may be employed instead of air.

*Example 3*

3 parts of that part of the initial material employed in Example 2 which is more readily soluble in ether, are heated to boiling with 250 parts of a 5 per cent aqueous solution of potassium hydroxide while passing air through the reaction mixture, until the reaction product is capable of being completely vatted to a red vat. The reaction product is practically pure 2.7-dimethylanthraquinone.

*Example 4*

2 parts of benzoquinone and 3 parts of 1.3-butadiene are heated at 100° C. in an autoclave for 3 hours, whereupon the resulting condensation product, which is very similar in its physical properties to the starting material employed in the preceding examples, is boiled for 4 to 5 hours with 10 parts of a 5 per cent alcoholic caustic potash solution, air having access to the reaction mixture. The product crystallizing out in the form of needles on cooling is practically pure anthraquinone.

An aqueous solution of caustic alkali may be employed instead of the alcoholic caustic potash solution and other substances taking up hydrogen for instance potassium ferricyanide or the sodium salt of m-nitrobenzene sulphonic acid instead of air.

*Example 5*

By condensing 10 parts of p-benzoquinone with 16.5 parts of 1.3-butadiene under pressure at 70° C. a product is obtained crystallizing in colorless needles from petroleum ether. 16 parts of the said product are heated at 100° C. in a closed vessel with 9 parts of 2.3-dimethyl-1.3-butadiene whereby a condensation product is obtained crystallizing in long white needles from carbon tetrachloride which probably corresponds to the formula:

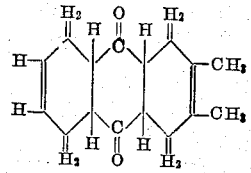

A suspension of 2 parts of the said latter condensation product in 100 parts of a 10 per cent aqueous solution of caustic soda is boiled while passing a current of air until a sample dissolves completely on the addition of sodium hydrosulphite giving a red solution. The product thus obtained is practically pure 2.3-dimethylanthraquinone.

*Example 6*

10 parts of the condensation product from 1 molecular proportion of alpha-naphthoquinone and 1 molecular proportion of 1.3-butadiene (see Annalen 460,110) are boiled with 200 parts of a 5 per cent caustic potash solution, in a current of air for several hours. The anthraquinone obtained in an approximately quantitative yield is practically pure.

Other reagents capable of splitting off hydrogen, for instance potassium ferricyanide, or sodium m-nitrobenzene sulphonate, may be used instead of air.

*Example 7*

10 parts of the condensation product from 1 molecular proportion of alpha-naphthoquinone and 1 molecular proportion of isoprene are boiled for several hours with 200 parts of a 5 per cent aqueous solution of caustic potash while passing a current of air through the reaction mixture. A nearly quantitative yield of practically pure 2-methylanthraquinone is obtained.

Other agents capable of splitting off hydrogen by oxidation, such as, for example, potassium ferricyanide and sodium m-nitrobenzene sulphonate may be used instead of air.

*Example 8*

6 parts of alpha-naphthoquinone are heated for a short time at 70° C. with 5 parts of 2.3-dimethyl-1.3-butadiene and 12 parts of ethyl alcohol. The reaction mixture solidifies to a yellow pulp from which a uniform condensation product is obtained in the form of colorless needles by crystallization from ethyl alcohol, the properties of the product being similar to those of the condensation product of alpha-naphthoquinone and 1.3-butadiene.

6 parts of the condensation product thus obtained are heated to boiling with a solution of 35 parts of potassium ferricyanide in 200 parts of a 5 per cent aqueous solution of potassium hydroxide, until the reaction product can completely be vatted to a red vat. The 2.3-dimethylanthraquinone thus obtained in an excellent yield melts at 200° C. and is consequently nearly pure. A product of the correct melting point can be obtained by recrystallization from dilute acetic acid to which preferably a small amount of an oxidizing substance, such as for example chromic acid anhydride, has been added.

*Example 9*

6 parts of 5-amino-1.4-naphthoquinone are heated to boiling for 2 hours with 10 parts of ethyl alcohol and 3.2 parts of 2.3-dimethyl-1.3-butadiene. After cooling, the crude product is filtered by suction and purified by recrystallization from ethyl alcohol. The compound thus obtained forms faint red needles which are readily soluble in most organic solvents.

1 part of the new product is heated to boiling for 4 hours with 20 parts of a 5 per cent aqueous solution of caustic potash while passing a current of air through the reaction mixture. The product obtained forms a red powder when dry and red needles when recrystallized from aqueous pyridine. It is difficultly soluble in ethyl alcohol but readily soluble in benzene. It dissolves in concentrated sulphuric acid giving a yellow brown solution and gives a yellow red vat with an alkaline hydrosulphite solution. It is 6.7-dimethyl-1-amino-anthraquinone according to its production and its properties.

*Example 10*

10 parts of the product employed in Example 6 are well shaken together with 100 parts of concentrated hydrochloric acid while excluding the air, until the suspension, being mobile in the beginning, becomes hardened to a stiff paste. The product of displacement is filtered off by suction, preferably while excluding the air, and carefully dried after washing with water. It forms when freshly prepared nearly colorless microscopic needles, which on exposure to the air soon assumes grey blue to blue colors. The product of displacement dissolves when excluding the air in caustic alkali solutions with a yellow coloration.

*Example 11*

A suspension or solution of the reaction product obtained according to Example 10 (as a moist press cake) in 250 parts of alcohol is heated to about 50° C. and an excess of an alcoholic solution of ferric chloride is then slowly added. At first a blue colored intermediate product appears, apparently of a quinhydronic nature. The final product of the oxidation separates out in yellow needles and can be purified by recrystallization from benzene. It is practically insoluble in ether, petroleum ether or cold alcohol, difficultly in warm alcohol, but more easily in hot benzene and glacial acetic acid. From benzene, yellowish, solid prismatic crystals are obtained. Alkaline hydrosulphite solution dissolves them with a yellow coloration.

*Example 12*

10 parts of the condensation product employed in Example 6 are stirred in a current of nitrogen with 200 parts of a 5 per cent caustic potash solution at room temperature for 3 hours, whereupon the yellow reaction mass containing the product of displacement principally as a precipitate is acidified with acetic acid.

The reaction product is identical with that described in Example 10.

*Example 13*

10 parts of the condensation product employed in Example 8 are boiled with 100 parts of pyridine for 2 to 3 hours, and the reaction product, being more or less blue in color if the process of displacement has not been carried out while excluding the air, is then precipitated by the addition of water, and is dehydrogenated by a treatment with an alcoholic ferric chloride solution into the compound described in Example 11.

If a current of air is passed through the solution of the product of displacement in pyridine for a longer period of time, dehydrogenation also takes place to form the quinone described in Example 11, which finally yields anthraquinone.

Example 14

A solution of 0.2 part of bromine in 1 part of carbontetrachloride is slowly added, while stirring, to a solution of 3 parts of the condensation product employed in Example 10, in 50 parts of carbontetrachloride. After a short time the reaction mass is converted into a blue-white crystalline paste, which is filtered off by suction and washed with carbontetrachloride. The product thus obtained is substantially identical with that produced according to Example 10. The conversion apparently is effected by hydrobromic acid formed by the dehydrogenation of a small quantity of the initial material by the bromine.

Example 15

20 parts of concentrated hydrochloric acid are added to a solution of 5 parts of the condensation product employed in Example 8 in 120 parts of hot alcohol. The mixture is heated on the water bath until the precipitate no longer increases. The product of displacement is filtered off by suction and can be purified by recrystallization from alcohol. The properties of the 2.3-dimethyl-1.4-dihydro-9.10-dihydroxyanthracene thus obtained are very similar to those of 1.4-dihydro-9.10-dihydroxyanthracene. In order to dehydrogenate it to form 2.3-dimethyl-1.4-dihydroanthraquinone, a suspension of 5 parts of the dihydro product in 50 parts of alcohol is stirred at the temperature of the water bath together with a solution of 10 parts of ferric chloride in 50 parts of alcohol, until the color of the reaction product has changed to a pure yellow. The crude product after having been filtered off by suction can be purified by recrystallization from benzene. The reactions of the pure 2.3-dimethyl-1.4-dihydroanthraquinone are very similar to those of 1.4-dihydroanthraquinone.

Example 16

2 parts of the condensation product obtained from 1 molecular proportion of 1.4-naphthoquinone and 1 molecular proportion of 1.3-butadiene as employed in Example 6 are heated to boiling together with a solution of 8 parts of anhydrous ferric chloride in 20 parts of alcohol for 1 hour. After cooling, the precipitated yellow needles are filtered off by suction. They consist of pure 1.4-dihydroanthraquinone. Instead of employing alcoholic ferric chloride solution, an aqueous solution thereof may be employed. In the latter case it is preferable to heat a little longer.

Example 17

1 part of the product obtainable by heating at 100° C. for 6 hours a solution of 1 molecular proportion of naphthazarine and 1 molecular proportion of 1.3-butadiene in benzene, crystallizing in yellow needles, is stirred together with 10 parts of a 5 per cent caustic soda solution at room temperature under admission of air, until the reaction mass forms a blue violet paste of crystals. The separated blue violet needles very probably consist of the disodium salt of the 5.8-dihydro-1.4-dihydroxyanthraquinone. The free dihydroxy compound is obtained by the action of acids, and can be purified for example by recrystallization from glacial acetic acid. It forms solid brown needles, being practically insoluble in alcohol and benzene, but fairly readily soluble in hot glacial acetic acid. In caustic soda solution they dissolve with a reddish blue color, considerably more bluish than quinizarine, and in concentrated sulphuric acid violet red. By treatment with acetic anhydride, the 5.8-dihydro-1.4-dihydroxyanthraquinone gives a diacetate, crystallizing in orange needles, which can be converted into quinizarine diacetate with chromic acid in glacial acetic acid.

Example 18

If instead of the condensation product employed in Example 17 from naphthazarine and 1.3-butadiene that from naphthazarine and 2.3-dimethyl-1.3-butadiene, crystallizing in yellow needles from petroleum ether and obtainable in an analogous manner is employed, a hydroxy compound is obtained, being very similar in its physical and chemical properties to that described in Example 17, which probably may be regarded as 5.8-dihydro-6.7-dimethyl-1.4-dihydroxyanthraquinone, represented by the following formula:

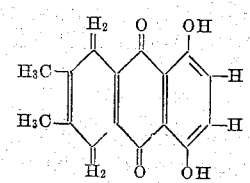

By treating the 5.8-dihydro-6.7-dimethyl-1.4-dihydroxyanthraquinone with acetic anhydride a diacetate is obtained which by oxidation by means of chromium trioxide in glacial acetic acid is converted into 6.7-dimethylquinizarine diacetate, from which the 6.7-dimethylquinizarine is produced by saponification by means of dilute acid. The said 6.7-dimethylquinizarine is very similar in its properties to quinizarine.

Example 19

A solution of 3 parts of the condensation product employed in Example 6 of alpha-naphthoquinone and 1.3-butadiene in 75 parts of naphthalene is boiled in a current of nitrogen practically free from oxygen, until no more of the initial compound is present, and the reaction mass is then treated with boiling petroleum ether. The residue is composed of pure 1.4-dihydro-9.10-dihydroxyanthracene. From the mother liquors small amounts of a compound crystallizing in blue needles can be obtained, which is identical with the intermediate product, described in Example 11, probably of a quinhydronic character.

The reaction takes the same course, if the condensation product employed as the initial material is heated alone in the absence of any solvent for some time, while excluding the air, for example to a temperature of from 180° to 185° C.

*Example 20*

3 parts of the condensation product employed in Example 6 are boiled with 200 parts of water in a current of nitrogen, until the reaction product has become soluble in caustic alkali solution. It is identical with the dihydro-9.10-dihydroxyanthracene described in Example 10.

*Example 21*

A strong current of air is passed from 15 to 20 minutes through a solution of 6 parts of the condensation product obtained from 1 molecular proportion of alpha-naphthoquinone with 1 molecular proportion of 1.3-butadiene in 150 parts of boiling naphthalene. After cooling, the melt is treated with boiling petroleum ether and the anthraquinone remaining undissolved is purified by sublimation or crystallization. By the employment of catalysts, for example of copper chromate, the dehydrogenation can be considerably accelerated. When treating the condensation product from 1 molecular proportion of alpha-naphthoquinone and 1 molecular proportion of 2.3-dimethyl-1.3-butadiene in the manner described, 2.3-dimethylanthraquinone is obtained.

*Example 22*

The condensation product obtained by heating equal quantities of 2-chlor-1.4-naphthoquinone and 2.3 dimethyl-1.3-butadiene at 70° C. is heated to boiling for a short time with 20 times its weight of 5 per cent caustic soda solution with the addition of a little sodium hydrosulphite. The yellow solution thus obtained contains the 2.3-dimethyl-1.4-dihydro-9.10-dihydroxyanthracene described in Example 15. By passing air through this liquid while cooling it to 0° C., a colorless floculent precipitate is produced which consists mainly of the 2.3-dimethyl-1.4-dihydroanthraquinone also described in the said example.

*Example 23*

1 part of the condensation product of 1 molecular proportion of 2.3-dichlornaphthoquinone and 1 molecular proportion of 2.3-dimethyl-1.3-butadiene which crystallizes from alcohol as colorless laminæ, is boiled with 15 parts of a 5 per cent alcoholic caustic potash solution for 2 hours. The 2.3-dimethylanthraquinone thus obtained is precipitated by means of water, and is crystallized from benzene.

*Example 24*

The condensation product of 5-nitro-2.3-dichlor-1.4-naphthoquinone and 2.3-dimethyl-1.3-butadiene, which crystallizes from a mixture of petroleum ether and benzene as colorless needles is heated with 20 times its weight of a 5 per cent aqueous caustic potash solution for 2 hours at the boiling point. The yellow red vat obtained by adding hydrosulphite to the reaction mixture is filtered and blown with air. The red precipitate which separates out is filtered off by suction and crystallized from aqueous pyridine. The product so obtained is identical with that in Example 9 and thus is probably 6.7-dimethyl-1-amino-anthraquinone.

*Example 25*

Equal parts of 2-chlor-1.4-naphthoquinone and isoprene are heated for 5 hours under pressure at 120° C. The viscous mass is then thoroughly stirred with alcohol, and after some time the reaction product separates out in a solid form. It can be purified by crystallization for example from benzene and then consists of pure 2-methylanthraquinone.

*Example 26*

A solution of 5 parts of 2-chlor-1.4-naphthoquinone and 5 parts of 2.3-dimethyl-1.3-butadiene in 20 parts of alcohol is heated in a closed vessel for 5 hours at from 100° to 105° C. After cooling, the crystal pulp is filtered off by suction and the residue crystallized for example from benzene. Colorless needles of pure 2.3-dimethylanthraquinone are obtained.

*Example 27*

Equal parts of 2-chlor-1.4-naphthoquinone and 1.3-butadiene are heated for several hours to about 125° C. The reaction product when crystallized from benzene is pure 1.4-dihydroanthraquinone.

*Example 28*

2 parts of the initial material employed in Example 22 are heated to boiling for 1 hour with 10 parts of pyridine while excluding air. The product crystallizing in needles on cooling is practically pure 2.3-dimethylanthraquinone. On diluting the mother liquor with water bluish colored needles are separated which may be purified by recrystallization or sublimation. The product is identical with the 2.3-dimethyl-1.4-dihydro-9.10-dihydroxyanthracene described in Example 15.

*Example 29*

1 part of the reaction product obtainable by heating equal parts of 5-nitro-2.3-dichlor- 1.4-naphthoquinone and 1.3-butadiene for 2 hours at about 130° C., is boiled for 2 hours with 20 parts of a 5 per cent aqueous solution of potassium hydroxide. Sodium hydrosulphite is then added to the reaction mixture and the red vat obtained filtered. By blowing air through the filtrate 1-aminothraquinone is precipitated which may be purified by recrystallization from pyridine.

*Example 30*

50 parts of concentrated hydrochloric acid are added to a solution of 10 parts of the condensation product obtained from 1 molecular proportion of p-benzoquinone and 2 molecular proportions of 1.3-butadiene in 100 parts of alcohol while heating. A thin paste of crystals is formed at once, from which the isomeric product is obtained in a pure state by filtration and washing with water. Generally speaking it recrystallizes in small colorless needles from most various organic solvents, in which it generally is more difficultly soluble than the initial material.

10 parts of the product thus obtained are heated to 120° C. with 135 parts of a 15 per cent alcoholic ferric chloride solution under pressure for some hours. The product obtained after cooling, in the form of needles being substantially 1.4.5.8-tetrahydro-9.10-dihydroxyanthracene, can for example be purified by recrystallization from ethyl alcohol. It dissolves nearly colorless in aqueous solutions of caustic alkalies. On exposure to the air it becomes violet, more readily when moist, probably due to the formation of a product of a quinhydronic nature.

*Example 31*

20 parts of anhydrous ferric chloride are added to a warm solution of 10 parts of 1.4.5.8-tetrahydro-9.10-dihydroxyanthracene, prepared according to Example 30, in 120 parts of ethyl alcohol, yellowish flakes separating at once. By recrystallization of the crude product from benzene, 1.4.5.8-tetrahydroanthraquinone is obtained in the form of long yellow needles, being very difficultly soluble in methanol, more readily in ethyl alcohol, benzene or glacial acetic acid. In a finely divided condition the quinone rapidly assumes a brown color on exposure to light. It dissolves to a colorless solution in an alkaline hydrosulphite solution forming an alkali metal salt of the 1.4.5.8-tetrahydro-9.10-dihydroxyanthracene described in Example 30.

*Example 32*

A stream of nitrogen containing 0.2 to 0.5 per cent of oxygen is passed for several hours through a suspension of 10 parts of the starting material employed in Example 30, in 100 parts of a 10 per cent aqueous solution of caustic soda at a temperature of 80° C. The reaction liquid having a faintly red color probably due to a low content of 9.10-dihydroxyanthracene is treated after cooling to about 5 to 10° C. with air until the red coloration disappears. The almost colorless solution of the 1.4.5.8-tetrahydro-9.10-dihydroxyanthracene is filtered off from the unaltered intermediate product and from a little quantity of anthraquinone while excluding the air, and is then acidified with acetic acid. The precipitate having a faintly violet color, is practically identical with the 1.4.5.8-tetrahydro-9.10-dihydroxyanthracene described in Example 30.

*Example 33*

A solution of 30.5 parts of potassium ferric cyanide and 20 parts of caustic soda in 200 parts of water is allowed to drop into a suspension of 10 parts of the same initial material employed in the foregoing example, in 300 parts of a 10 per cent solution of caustic soda, at a temperature of 60° to 70° C. while excluding air. The suspension is stirred at the same temperature for some hours. The liquid then is cooled to from 5° to 10° C. and worked up as described in Example 32.

*Example 34*

5 parts of the rearrangement product obtainable according to the first paragraph of Example 30, are heated to boiling for several hours with 10 parts of potassium hydroxide in 200 parts of ethyl alcohol, with the exclusion of air. After cooling, the red orange colored solution is diluted with water and then by acidifying with acetic acid the hexahydro-9.10-dihydroxyanthracence separates out in the form of a pale reddish colored flocculent precipitate. It crystallizes from glacial acetic acid in the form of small brown colored needles. In contrast to the isomeric initial material it dissolves in aqueous solutions of alkalies giving a light yellow coloration. It is also readily soluble in organic solvents of low boiling point.

The same hexahydro-9.10-dihydroxyanthracence is obtained when the condensation product obtained from 1 molecular proportion of benzoquinone and 2 molecular proportions of 1.3-butadiene is subjected to the treatment hereinbefore described.

*Example 35*

5 parts of the initial material employed in Example 34 are introduced with the exclusion of air into a mixture of 10 parts of potassium hydroxide and 200 parts of isopropyl alcohol and the reaction mixture is heated for some time at 70° C. After cooling, small traces of unchanged initial material are filtered off and the hexahydro-9.10-dihydroxyanthracene is then precipitated from the filtrate by means of glacial acetic acid.

Example 36

A suspension of 5 parts of the initial material employed in Example 34 in 50 parts of ethyl alcohol is introduced with the exclusion of air into a solution of 5 parts of metallic sodium in 150 parts of anhydrous ethyl alcohol, and the mixture is then heated for several hours at 80° C. By acidifying the clear solution obtained the hexahydro-9.10-dihydroxyanthracene separates out in the form of a pale red colored precipitate.

Example 37

A solution of 5 parts of the hexahydro-9.10-dihydroxyanthracene obtainable according to Examples 34, 35 or 36 in 100 parts of glacial acetic acid is treated with a solution of 10 parts of ferric chloride in 100 parts of water. The mixture is then boiled until all the ferric chloride is used up. When cooled, hexahydroanthraquinone separates out in the form of a yellow precipitate. The new product dissolves in most organic solvents, and crystallizes from ligroin in beautiful long yellow needles. It becomes dark in color when exposed to light, especially when it is in a finely divided state.

What we claim is:—

1. A process of producing anthraquinone and derivatives thereof, which comprises causing a product of the formula

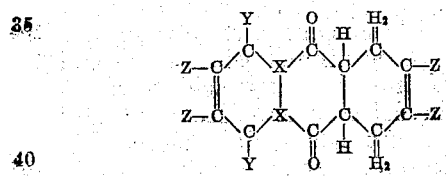

in which Y may be H, OH or $NH_2$ when X must be C, or Y may be $H_2$ when X must be C—H, and Z is H or $CH_3$, to react under non-acid conditions with an oxidizing agent other than ozone.

2. A process of producing anthraquinone and derivatives thereof, which comprises causing a product of the formula

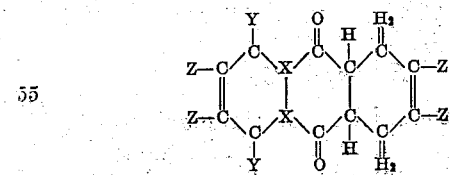

in which Y may be H, OH or $NH_2$ when X must be C, or Y may be $H_2$ when X must be C—H, and Z is H or $CH_3$, to react in the presence of caustic alkali with an oxidizing agent other than ozone.

3. A process of producing anthraquinone and derivatives thereof, which comprises heating a product of the formula

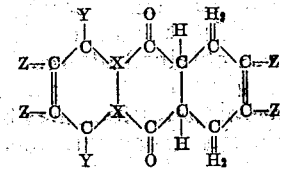

in which Y may be H, OH or $NH_2$ when X must be C, or Y may be $H_2$ when X must be C—H, and Z is H or $CH_3$, in an aqueous solution of caustic alkali with an oxidizing agent other than ozone.

4. A process of producing anthraquinone and derivatives thereof, which comprises heating a product of the formula

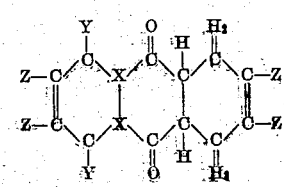

in which Y may be H, OH or $NH_2$ when X must be C, or Y may be $H_2$ when X must be C—H, and Z is H or $CH_3$, in an aqueous solution of caustic alkali with air.

5. A process of producing anthraquinone and derivatives thereof, which comprises causing a product of the formula

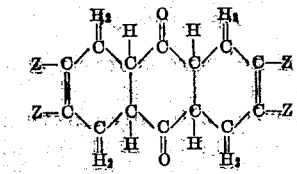

in which Z stands for H or —$CH_3$, to react under non-acid conditions with an oxidizing agent other than ozone.

6. A process of producing anthraquinone and derivatives thereof, which comprises causing a product of the formula

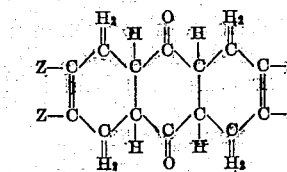

in which Z stands for H or —$CH_3$, to react in the presence of caustic alkali with an oxidizing agent other than ozone.

7. A process of producing anthraquinone and derivatives thereof, which comprises heating a product of the formula

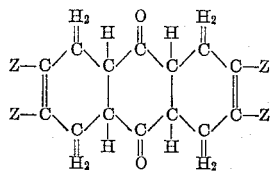

in which Z stands for H or $-CH_3$, in an aqueous solution of caustic alkali with an oxidizing agent other than ozone.

8. A process of producing anthraquinone and derivatives thereof, which comprises heating a product of the formula

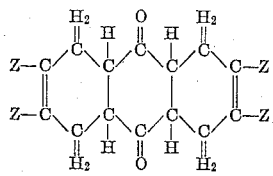

in which Z stands for H or $-CH_3$, in an aqueous solution of caustic alkali with air.

9. A process of producing anthraquinone and derivatives thereof, which comprises causing a product of the formula

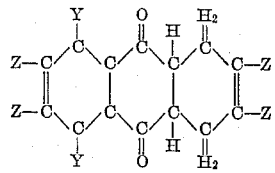

in which Y stands for H, OH or $NH_2$ and Z for H or $CH_3$, to react under non-acid conditions, with an oxidizing agent other than ozone.

10. A process of producing anthraquinone and derivatives thereof, which comprises causing a product of the formula

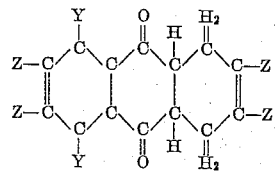

in which Y stands for H, OH or $NH_2$ and Z for H or $CH_3$, to react in a neutral organic medium, with an oxidizing agent other than ozone.

11. A process of producing anthraquinone and derivatives thereof, which comprises heating a product of the formula

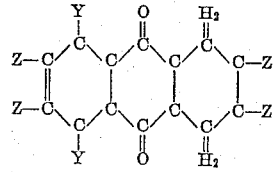

in which Y stands for H, OH or $NH_2$ and Z for H or $CH_3$, in naphthalene, with an oxidizing agent other than ozone.

12. A process of producing anthraquinone and derivatives thereof, which comprises heating a product of the formula

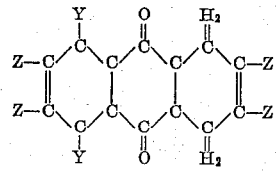

in which Y stands for H, OH or $NH_2$ and Z for H or $CH_3$, in naphthalene, with air.

In testimony whereof we have hereunto set our hands.

ARTHUR LÜTTRINGHAUS.
HEINRICH NERESHEIMER.
WILLY EICHHOLZ.
GEORG BOEHNER.
WILHELM SCHNEIDER.